United States Patent [19]

Frederick

[11] Patent Number: 5,244,002
[45] Date of Patent: Sep. 14, 1993

[54] SPOOL POSITION INDICATOR

[75] Inventor: Thomas R. Frederick, Amherst, N.Y.

[73] Assignee: Moog Controls, Inc., East Aurora, N.Y.

[21] Appl. No.: 809,931

[22] Filed: Dec. 18, 1991

[51] Int. Cl.5 .......................................... F15B 13/043
[52] U.S. Cl. ........................................ 137/1; 137/554; 137/625.62; 137/625.64
[58] Field of Search ............... 137/554, 625.62, 625.64, 137/1

[56] References Cited

U.S. PATENT DOCUMENTS

| 3,835,888 | 9/1974 | Leutner et al. | 137/625.64 X |
|---|---|---|---|
| 4,176,586 | 12/1979 | Stoll et al. | |
| 4,310,143 | 1/1982 | Determan | 137/625.64 X |
| 4,372,192 | 2/1983 | Liennu | |
| 4,456,031 | 6/1984 | Taplin | 137/625.62 |
| 4,585,029 | 4/1986 | Harding | 137/625.62 |
| 4,742,794 | 5/1988 | Hagstrom | |
| 4,793,241 | 12/1988 | Mano et al. | |
| 4,907,615 | 3/1990 | Meyer et al. | 137/625.62 X |
| 4,954,776 | 9/1990 | Husher | |

Primary Examiner—Gerald A. Michalsky
Attorney, Agent, or Firm—Wall and Roehrig

[57] ABSTRACT

An electro hydraulic servo valve has a pair of oppositely polarized magnets mounted in the surface of the spool of the valve to be controlled. A Hall effect sensor is mounted in the housing adjacent the magnets to precisely measure the position of the spool relative to the housing. The magnets and transducer are mounted on the longitudinal centerline of the spool to eliminate the spurious signals, due to temperature, vibrations, shock, hydraulic supply pressure and back pressure. The strength and spacing of the magnets and air gap are chosen to provide a linear output signal over the range of displacement desired and to provide the accuracy of location necessary for the particular configuration.

22 Claims, 6 Drawing Sheets

SPOOL POSITION INDICATOR

BACKGROUND OF THE INVENTION

This invention relates to a method and apparatus for accurately indicating the location of a spool in a hydraulic servo valve. More particularly, this invention relates to a linear Hall effect spool position indicator for electro hydraulic servo valves.

Two stage hydraulic servo valves have generally comprised a first stage valve element operated by any desired means such as an electrical torque motor or a pneumatic or hydraulic pilot valve and a second stage valve element having a spool axially movable within a casing by fluid pressure applied to one end or the other under control of the first stage valve element. Such valves have been typically controlled by a low power electrical or fluid command signal and in order to ensure precise accurate output from the device, it is necessary to know precisely the location of the second stage spool so as to accurately control its position in accordance with the first stage signal.

Various feedback mechanisms have been disclosed in the past including balanced beams, strain gauges and electro magnetic means actuated by displacement of the spool. For instance, in U.S. Pat. No. 4,585,029 to Harding there is shown a beam mounted for swinging movement with respect to the overall casing with one end of the beam being engaged by the spool and the other end of the beam carrying a Hall effect sensor. The Hall effect sensor is positioned between a magnet assembly housed in the casing so that as the beam is displaced by the spool, the other end is displaced within the magnetic field to create a signal proportional to the displacement to indicate the position of the spool. The beam is pivotally mounted on leaf springs with one end in the air gap of the magnetic circuit and the other end in a recess of the spool. This design has proven satisfactory for certain applications, but the beam construction is very sensitive to inaccuracies caused by spurious influences such as temperature, vibration, impact and the like. In addition, this construction must be very accurate and precise, and is therefore costly to effect. The mechanical nature of the construction also dictates a relatively bulky mechanical/physical structure that is difficult and costly to manufacture.

OBJECTS AND SUMMARY OF THE INVENTION

Accordingly, it is an object of the present invention to provide a spool position indicator that overcomes the limitations of the prior art.

It is another object of the present invention to provide a spool position indicator for an electro hydraulic valve assembly which is substantially immune to the effects of variations in temperature, vibration and severe mechanical motion of the valve device.

It is another object of the present invention to provide a spool position indicator of improved accuracy that is simple and easy to manufacture and rugged in use.

It is another object of the present invention to provide a very accurate signal that is linearly proportional to the motion of a spool in an electro hydraulic valve in which the signal zero, the signal span and the signal drift, due to changes in temperature, acceleration, supply pressure, or back pressure is substantially eliminated.

It is another object of the present invention to provide a signal that is linearly proportional to the displacement of a sliding spool over a wide range of speed and acceleration of the spool motion itself.

It is another object of the present invention to provide a linear Hall effect transducer and a pair of magnets to accurately indicate the positional location of the spool relative to the valve sleeve in which it is mounted.

It is another object of the present invention to provide a Hall effect transducer that can be rigidly and securely affixed to the sleeve and magnetic field means that can be fixed to the spool of the valve so as to withstand severe mechanical stresses encountered in hydraulic servo valves.

In one embodiment of the invention, the foregoing objects are achieved by the provision of a Hall effect transducer mounted in the sleeve of the valve at the longitudinal center line thereof and a pair of oppositely polarized magnets embedded in the surface of the spool at the longitudinal center of the spool so that the field of the magnets will intersect with the Hall effect transducer to produce an output signal proportional to the displacement of the spool within the valve sleeve.

BRIEF DESCRIPTION OF THE DRAWINGS

For a better understanding of these and other objects of the present invention, reference is made to the detailed description of the invention which is to be read in conjunction with the following drawings, wherein.

DETAILED DESCRIPTION OF A PREFERRED EMBODIMENT

Figure 1:
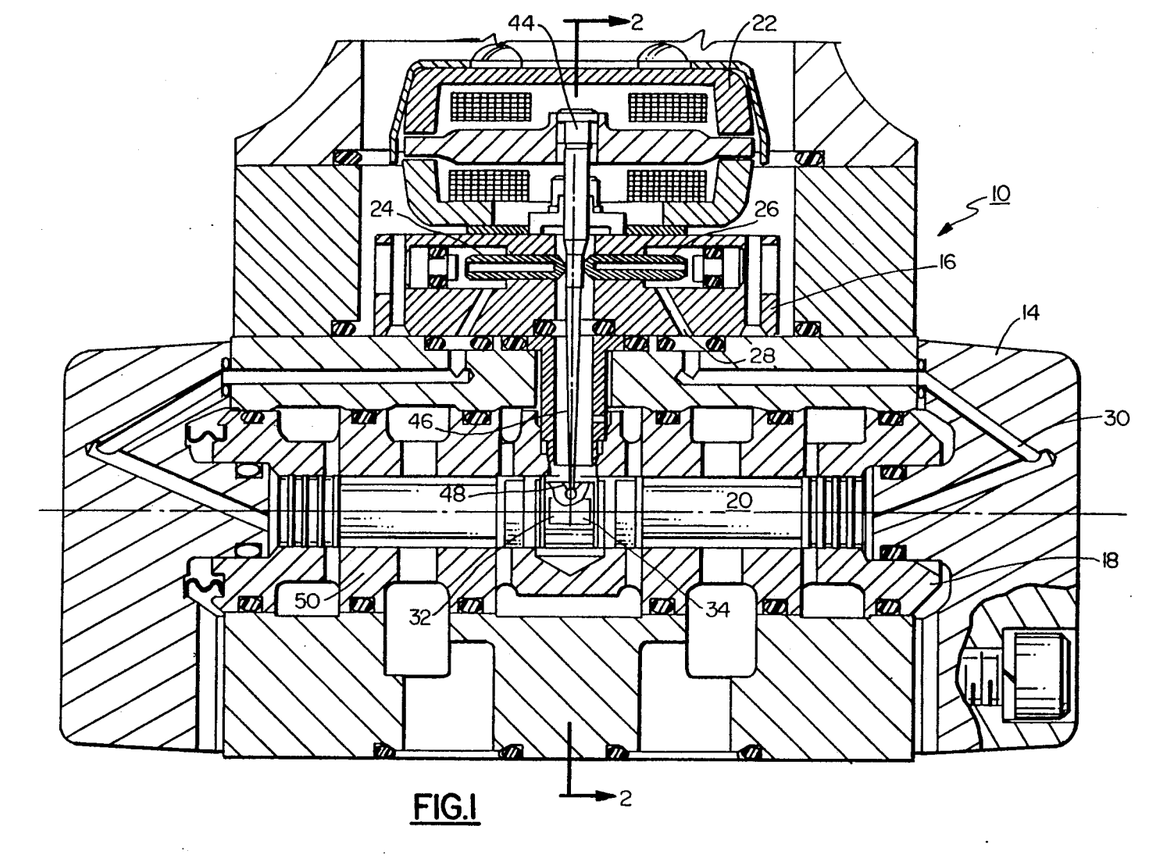
FIG. 1 is a cross sectional view through the spool axis of a valve according to the present invention.

Referring now to FIG. 1 there is shown a two stage electrohydraulic servo valve 10 according to the present invention. The valve consists generally of an outer housing 14 in which is mounted a first stage valve 16 and a second stage valve 18. Valve 16 is configured to apply pressure to either the right or left hand ends of the second stage valve spool 20 so as to shift the spool 20 either to the left or right in accordance with the command signal applied to the first stage valve. The first stage valve actuator is shown as an electric torque motor 22 which shifts the flapper 44 into contact with one or the other of the first stage orifices 24 and 26 so as to cause the back pressure in the selected side to build up and to apply a pressure to the corresponding end of the spool 20 so as to shift the spool 20 in the other direction. As can be clearly seen in FIG. 1, when the right hand orifice 26 is closed by contact with the flapper 44 caused by the offset rotation of the motor 22, the back pressure will build up through the channels 28 and 30 on the right hand side to the right hand end of the spool 20 applying an increased pressure to the right hand end of the spool and moving the spool to the left in FIG. 1 the desired amount to shift pressure from the input to the return as desired.

Figure 2:
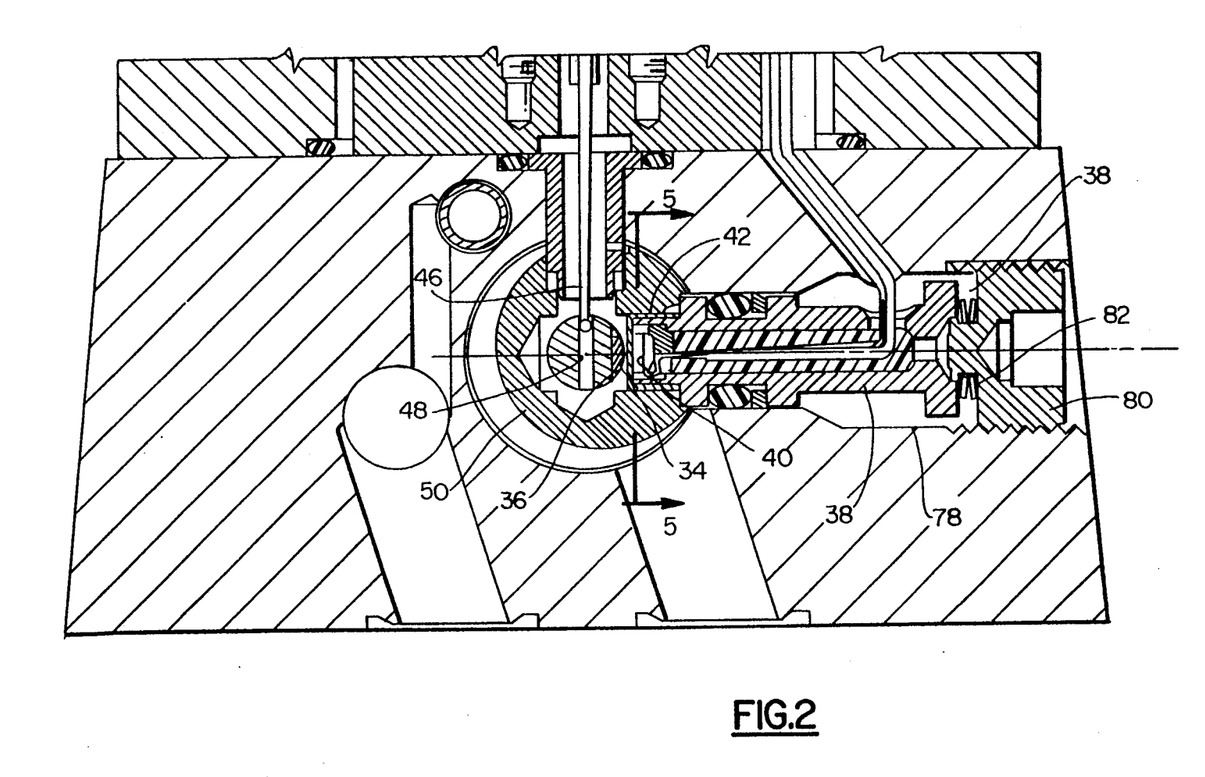
FIG. 2 is a partial cross sectional view taken on line 2—2 of FIG. 1.

Mounted on either side of the longitudinal center of spool 20 are a pair of rectangular magnets 32 and 34. The magnets are cemented or otherwise fixed on a flat 36 formed in the circumference of the spool. The magnets 32 and 34 are ground round at the edges to conform to the circumference of spool 20 (FIG. 2). Sensor assembly 38 is mounted in housing 14 at 90° to the axis of spool 20 with the Hall effect transducer 40, positioned just inside end cap 42 (FIG. 4) in close juxtaposition to the magnets 32 and 34.

As shown in FIGS. 1 and 2, the motor 22 and flapper 44 have an extended finger 46 with a ballpoint on the end which fits into a hole 48 in the movable spool 20. The only function in this embodiment of the finger 46 is to keep the spool 20 from rotating within its sleeve 50 so that the magnets 32 and 34 and the transducer 40 are maintained in proper field alignment, as will be described herein.

Figure 3:
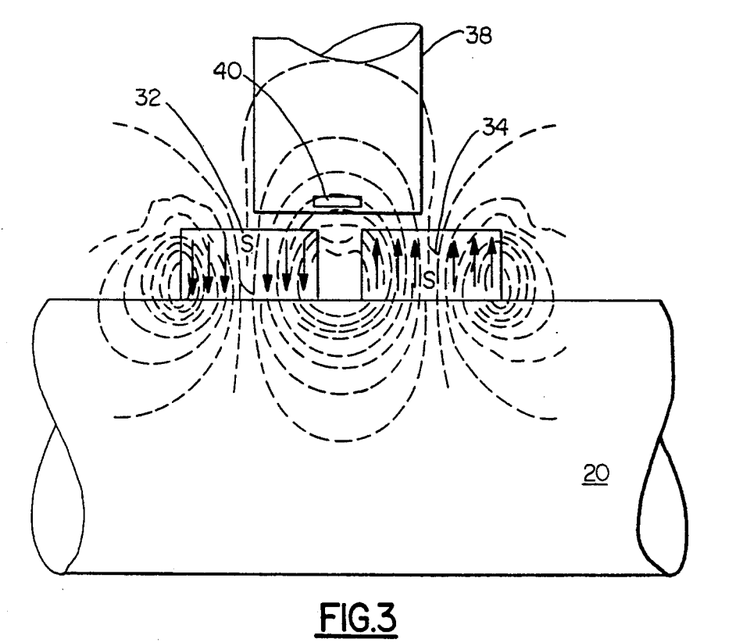
FIG. 3 is an enlarged scale partial cross sectional view similar to FIG. 1, rotated ninety degrees therefrom showing the magnetic field through the magnets and transducer.
Figure 4:
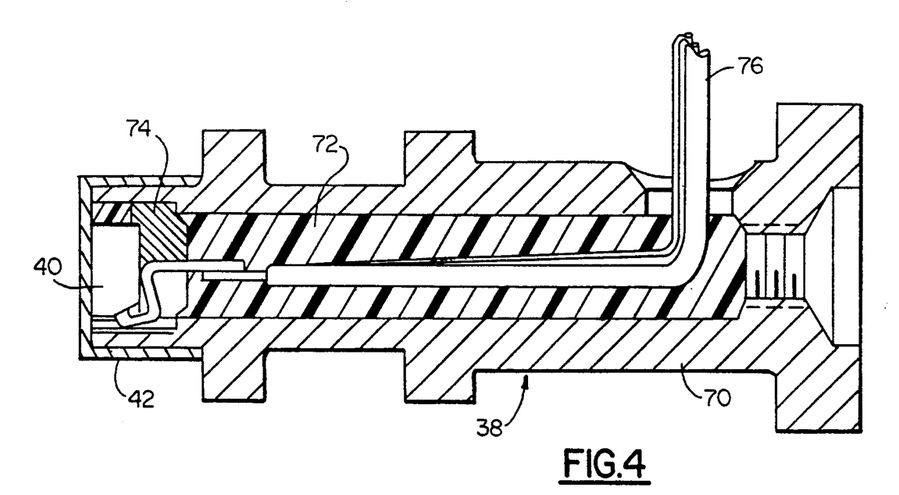
FIG. 4 is an enlarged partial cross section of a sensor according to the present invention.
Figure 5:
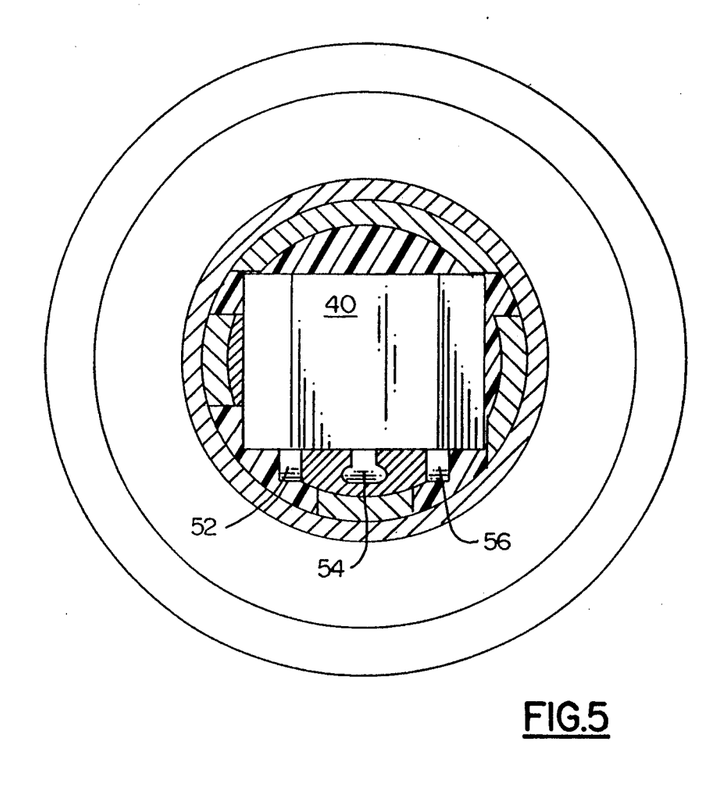
FIG. 5 is an enlarged partial cross section taken on line 5—5 of FIG. 2 showing the connections to the transducer.

As may be seen in FIGS. 1-3, the magnets 32 and 34 comprise a pair of oppositely polarized flat rectangular magnets which are mounted on a flat 36 in the side of the spool. The magnets are secured by use of a cement such as Loctite Speedbonder 325, as is well known in the industry and are then, after mounting, ground to conform to the outer circumference of the spool, as can be seen in FIG. 2. The Hall effect transducer 40 generally has three contact fingers 52, 54 and 56, which are bent as shown in FIG. 4 and connected through three wires which exit to the right from the transducer housing for connection to the processing/control unit for the valve 10.

Figure 6:
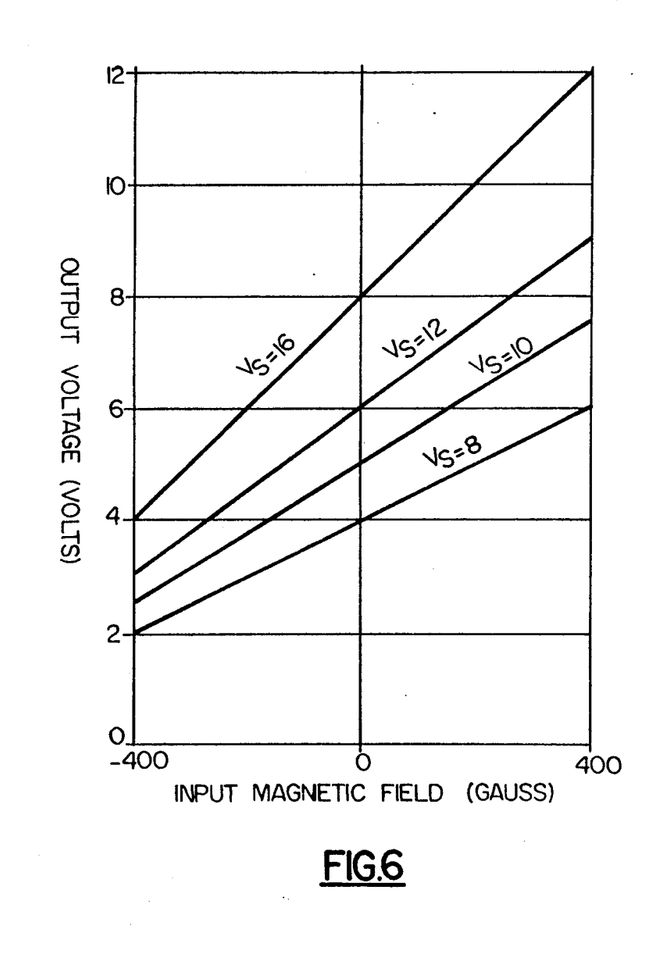
FIG. 6 is a graph of the transfer function showing the linear relationship between magnetic field strength and output voltage for a Hall effect transducer according to the present invention.
Figure 8:
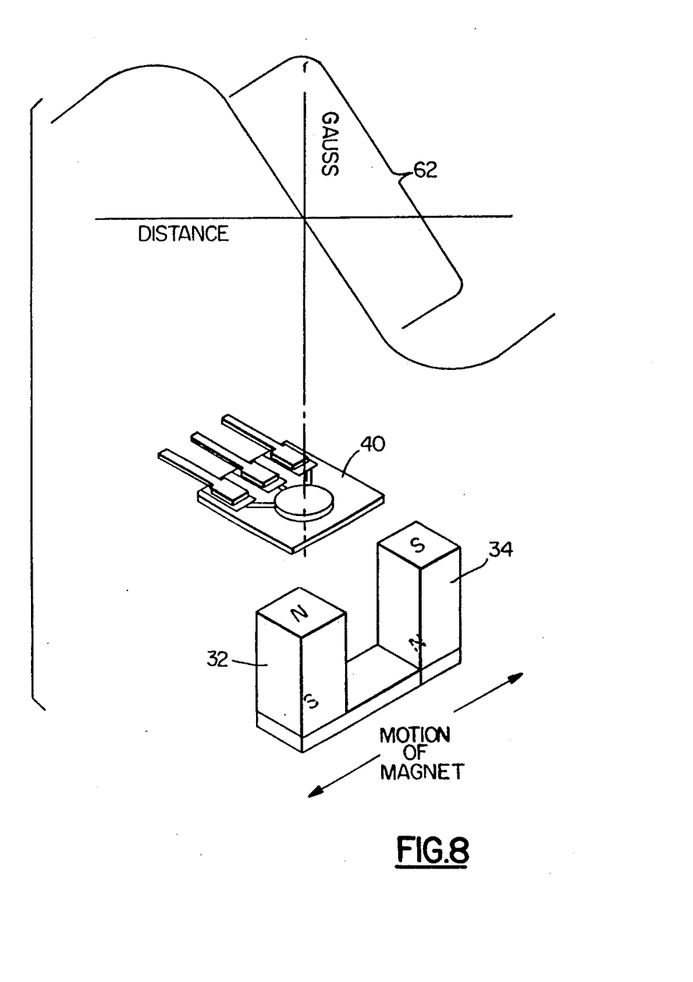
FIG. 8 is a view similar to FIG. 7 showing the effect on the magnetic field strength signal of separation of the adjacent magnets.

As may be seen in FIG. 3, with the magnets positioned as indicated, a field is set up which provides a strong enough signal to intersect the Hall effect transducer and to create in the transducer a voltage signal proportional to the displacement of the spool 20 relative to the zero point, i.e., the longitudinal center of the spool and second stage valve, in either the plus or minus direction. The linear transfer function and the magnetic field strength versus displacement are shown in FIGS. 6 and 8 for this configuration. FIG. 6 shows the linear relation between field strength and voltage output of transducer 40 for various supply voltages.

Figure 7:
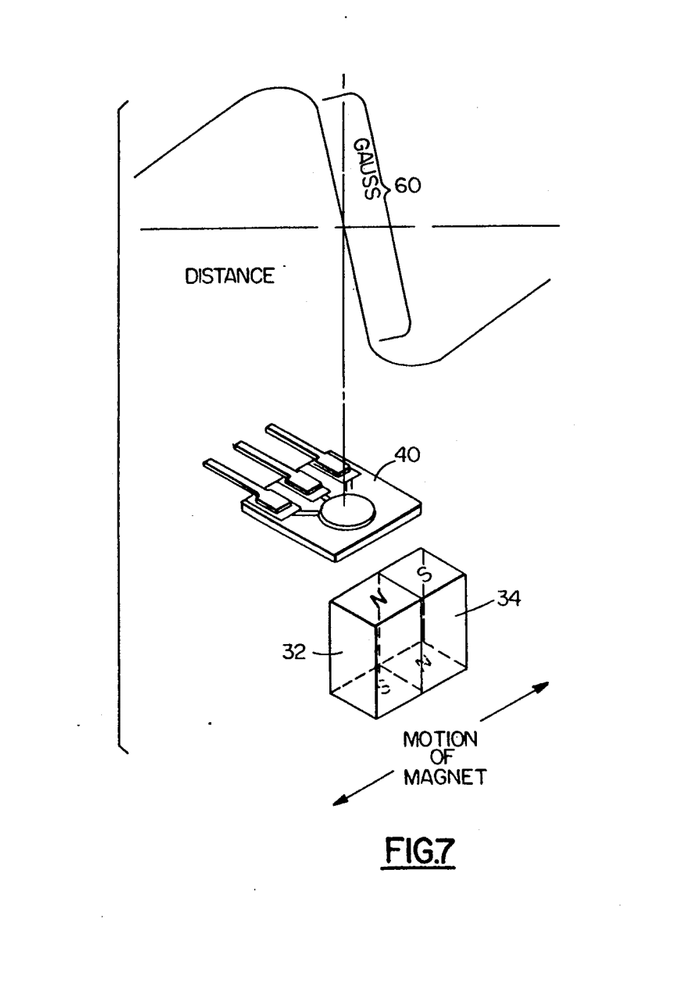
FIG. 7 is a graphic representation of the magnetic field strength relative to lateral movement of a pair of side by side magnets relative to the transducer.

Referring again to FIG. 1, it is seen that the two magnets 32 and 34 are mounted in abutting side-by-side relationship on either side of the longitudinal center line of the spool and valve. In this configuration the plot of field strength versus distance of displacement is as shown in FIG. 7. In either configuration the Hall effect transducer 40 is mounted on the longitudinal center line in the transducer assembly so as to sense field changes on either side of the longitudinal center line. As shown in FIG. 3, when on the center line the signal generated by the Hall effect transducer 40 is zero because the magnetic lines of force basically are parallel to the transducer on the center line. Any signals created, plus or minus, are canceled out. This can also be seen in FIGS. 7 and 8 which show that with the spool 20 centered in the valve and with the transducer 40 and magnets 32 and 34 mounted on the longitudinal center line, there is no signal generated in the Hall effect transducer. This also has another distinct advantage in that by mounting the magnets 32 and 34 and the transducer 40 on the longitudinal center line, changes in spool and/or valve dimensions due to temperature changes will not effect the zero signal because they will be uniformly balanced out. Also, it should be noted that with this construction changes in supply pressure or back pressure will not effect the zero signal since the four metering edges of the valve spool and valve are uniformly affected and will balance out also. It also must be pointed out that with the magnets 32 and 34 arranged as a pair with opposite magnetic poles exposed to the Hall effect sensor, the sensor sees a magnetic null when located on a plane whose points are equidistant to the two magnets. This results in temperature having an even effect on the magnetic field strength since, again, the changes caused by changes in temperature will cancel out. This is particularly so since the magnets are chosen to be as near identical as possible and the location and grinding, if any, as indicated above, result in a balanced effect.

FIGS. 7 and 8 are a plot of field strength in gauss versus distance from the centerline for a pair of abutted magnets and a pair of spaced magnets respectively. As shown in FIGS. 7 and 8, the linear portions 60 and 62 of the curves are of limited length and permit limited displacement of the spool before encountering non-linear signal effect. Thus, depending on the size and type of valve to be used, the curve must be set so that there is ample linear range for the generation of a linear signal proportional to the actual displacement of the spool relative to the Hall effect sensor. This slope and the length of displacement in the linear mode is controlled by the strength of the magnets mounted on the spool, by the spacing of the magnets (from touching to a suitable distance apart), and by the size of the air gap between the magnets and the transducer surface. For very small displacements, the curve of FIG. 7 will produce a very sharp, accurate and linear signal in the transducer which can be fed back to the control loop to precisely position the spool in a desired location. When it is desired to sense the spool movement over greater displacements, a "less steep" curve such as shown in FIG. 8 is used so as to maintain the linear output signal over a greater displacement range. In this case, if all else remains the same, the magnets can be spread apart a short distance such as shown in exaggerated form so as to lessen the steepness of the slope of the curve.

For instance, for a displacement of plus or minus fifteen thousandths of stroke, for the spool, magnets measuring 0.090"×0.080" and having an original thickness of approximately 0.040 inches and abutted at their edges and a transducer approximately 0.020" square have been found satisfactory. To obtain a stroke of at least plus or minus thirty-two thousandths, it has been found necessary to space the same magnets apart about 0.080 inches. The specific arrangements must be tailored to meet the requirements of the valve dimensions and spool stroke, the magnet strengths, and the air gap as well as the magnet spacing.

As may be seen in FIG. 2, the magnets are positioned on the spool by grinding a flat 36 in the circumference of the spool and gluing the magnets in proper position on this flat. In addition to providing a simple economical and effective way to mount the magnets, it also enhances the magnetic field distribution since recessing the magnets within a pocket of steel tends to short circuit the magnetic field to an undesired degree which, in the configuration shown in FIG. 2, is eliminated.

Figure 9:
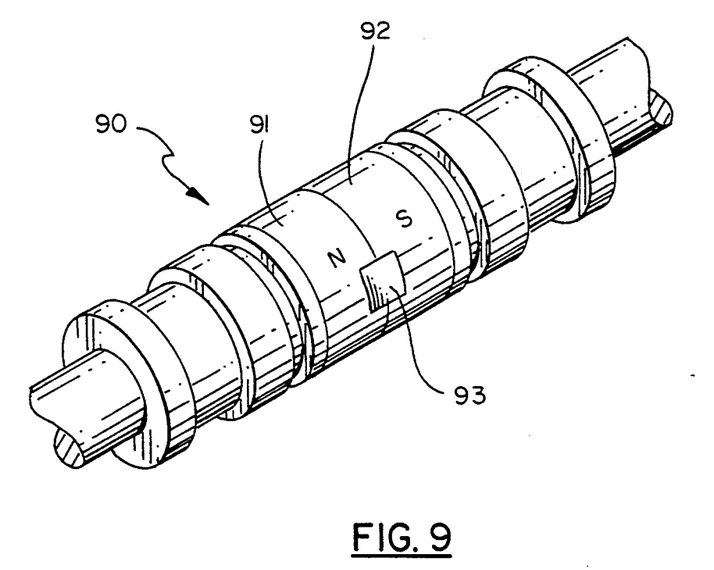
FIG. 9 is a perspective view showing a further embodiment of the invention.

As shown in FIG. 9, a pair of annular magnets spaced side-by-side in opposite polarity, a pair of annular magnetic rings 91-92 can be formed in the circumference of the spool 90 on either side of the centerline 93 thereof, and again oppositely polarized so as to provide the steep characteristic curves of FIGS. 7 and 8, upon displacement of the spool relative to the Hall Effect Transducer. With cylindrical magnets as shown in FIG. 9, the finger 46 may no longer be required with a valve such as shown in FIG. 1.

This balanced, symmetrical approach is to be contrasted with prior art devices such as Harding, referenced above, or other types of transducers such as variable displacement transducers or eddy current killed oscillator approaches. In many of these valves using these prior art systems for detecting movement of the spool, the transducer has been placed either in the end cap of the valve sleeve or in the end of the valve to sense the movement of the end of the spool and this subjects this type of technology to various extraneous signals which will shift the zero point due to changes in temperature, supply pressure, back pressure, and so forth. It is thus apparent that I have provided a means and method for sensing very accurately very small movements of the spool of a servo valve as well as larger more normal movements to indicate the position of the valve spool relative to the valve casing for feedback and control functions where very precise positioning of the spool, and ultimately the amount of fluid flow, is necessary for proper functioning of the circuit in which the device is used.

Referring again to FIG. 4 it should be noted that the Hall effect transducer 40 is mounted within an assembly 38 comprising the outer housing 70 which has affixed to the left hand end in FIG. 4 a sealed end cap 42 so as to make sure that hydraulic fluid or other fluid cannot penetrate into the interior of the housing. The unused spaces within the housing are filled with a potting compound 72 as is well known in the industry and a suitable seal 74 is provided for sealing the transducer 40 within the valve assembly 38. Thus, when assembly 38 is inserted in the valve sleeve, the transducer 40 is properly positioned and aligned with the magnets on the spool. The end cap 42 is made of a non-magnetic material so that the magnetic lines of force from the magnets 32 and 34 can penetrate and intersect the Hall effect transducer 40 which is mounted just inside the end cap. It should also be noted that the Hall effect transducer itself is symmetrically mounted on the axis of the housing so that the housing 70 can rotate slightly without affecting the magnetic signal. Rotation is limited by the pigtail conductors 76 exiting through the side wall when it is installed in the bore 78 in the valve housing 14. At the outboard end of the transducer assembly 38 plug 80 is threaded into the valve housing 14 and a spring 82 is positioned between the plug 80 and the transducer housing 38 with sufficient strength so as to balance out the hydraulic pressure that is encountered in the valve itself and applied to end cap 42. Without this spring, it is possible that the hydraulic pressure could jam the transducer housing against the plug and cause damage thereto, or at least inaccuracies in the field encountered by the transducer itself and thus introduce errors into the signal used to locate the precise position of the spool. Thus, the spring 82 must be sufficiently strong to overcome any anticipated pressure on the spool and in the valve cavity.

I have described the invention applied to a two stage electro-hydraulic valve but it will be understood by those skilled in the art that the invention could be applied to multiple stage valve systems with the magnets and transducers applied to two or more other stages to provide the desired degree of precision.

While this invention has been explained with reference to the structure disclosed herein, it is not confined to the details set forth and this application is intended to cover any modifications and changes as may come within the scope of the following claims:

What is claimed is:

1. A fluid servo valve comprising:
   an outer housing;
   a first valve member mounted in said outer housing forming a first stage of a servo valve;
   actuating means connected to said first valve member, said actuating means being connected to receive a command signal;
   a second valve member mounted in said outer housing forming a second stage of the servo valve, having a body portion with an axially displaceable spool element therein;
   said displaceable spool element being movable in said second valve member body portion under control of said first valve member;
   magnet means symmetrically mounted about an axial center of said displaceable spool element formed a magnetic null at said center;
   a Hall effect transducer fixed in said second valve member body portion centered on the magnetic null of said magnetic means on said spool element; and
   circuit means coupled to said Hall effect transducer for producing an analog output signal proportional to the axial displacement of said spool element, relative to said second valve member body portion.

2. A servo valve according to claim 1 wherein said magnet means and transducer are chosen to form a steep linear slope distance-field strength function for the Hall effect output signal in said Hall effect transducer so as to precisely measure spool element displacement relative to said second valve member.

3. A servo valve according to claim 1 wherein said magnet means comprises a pair of oppositely polarized magnets mounted on the surface of said spool element.

4. A servo valve according to claim 3 wherein said pair of magnets are mounted on said spool element centered about the longitudinal center of said spool element.

5. A servo valve according to claim 4 wherein said pair of magnets are embedded in the surface of said spool element and the outer surface thereof is contoured to form a smooth surface for movement within said second valve body.

6. A servo valve according to claim 3 wherein said spool element is generally cylindrical with a flat formed in the cylindrical surface of said spool element and said pair of magnets comprise a pair of thin rectangular blocks mounted on said flat; and the outer surface of said magnet blocks is rounded to match the circumference of said spool.

7. A servo valve according to claim 6 wherein said pair of rectangular magnet blocks are mounted in abutting side to side relationship.

8. A servo valve according to claim 6 wherein said pair of rectangular magnet blocks are spaced apart a predetermined distance so as to produce a linear displacement signal in said Hall effect transducer over a greater displacement of said spool than when said magnet blocks abut each other.

9. A servo valve according to claim 6 wherein said Hall effect transducer is mounted in a plane parallel to the plane of said pair of magnets centered about an axis perpendicular to the plane of said magnets at the center thereof.

10. A servo valve according to claim 3 wherein said displaceable spool element is mounted in a cooperating bore in said second valve member; and said Hall effect transducer is mounted in the inner surface of said cooperating bore adjacent said magnet means.

11. A servo valve according to claim 10 wherein said Hall effect transducer is embedded in the inner surface of said cooperating bore in said second valve member opposite and longitudinally centered on said pair of magnets embedded in said spool element when in a neutral position.

12. A servo valve according to claim 1 wherein said magnet means comprise a pair of oppositely polarized annular magnetic rings mounted about the circumference of said spool element.

13. A servo valve according to claim 12 wherein said annular magnetic rings are positioned one on either side of the longitudinal center of said spool in close abutting relationship.

14. An electro-hydraulic servo valve according to claim 1 wherein said actuating means connected to said first valve member comprises an electric torque motor mounted to selectively cause said first valve member to apply hydraulic fluid pressure to said second valve member to move said spool element a predetermined amount.

15. In a hydraulic servo valve having a valve body, a spool displaceably mounted in the valve body and means for selectively positioning the spool in the valve body, the method of controlling the position of a movable spool element in a valve body which comprises the steps of:

determining a hydraulic null position of a spool element in a valve body;

determining a magnetic null of a magnetic field means;

mounting said magnetic field means on said spool element centered at an axial center thereof so that the hydraulic null position and magnetic null position coincide;

determining the signal output null of a Hall effect transducer;

mounting said Hall effect transducer at a position in said valve body corresponding to the spool element axial center and adjacent said magnetic field means so that the Hall effect signal null and the hydraulic null positions coincide;

displacing said movable spool element to generate a signal in said Hall effect transducer;

deriving a linear signal from said Hall effect transducer signal proportional to the movement of said spool element; and using said Hall effect transducer signal to control the position of said spool element;

whereby the extraneous effect of temperature, supply pressure, acceleration and back pressure on the Hall effect transducer signal are eliminated.

16. The method according to claim 15 wherein determining the hydraulic null position of a spool element in a valve body includes:

forming at least one pair of metering edges on the movable spool element relative to the valve body; and positioning one edge of said pair symmetrically on either side of the hydraulic null position of said movable spool in said valve body.

17. Apparatus for accurately determining the location of a movable fluid control element which includes:

a moveable spool means in a valve body;

magnet means fixed at a predetermined location on said movable spool means, said magnet means being centered about an axial center point on said movable spool means;

Hall effect transducer means fixed in said valve body at a position corresponding to said magnet means;

said magnet means and said Hall effect transducer means being selected and spaced apart to provide a generally linear magnetic field strength versus displacement function so that axial movement of said movable spool means relative to said center point on said movable spool means produces an output signal in said Hall effect transducer, within the range of said field strength versus displacement function, that is directly proportional to said spool displacement.

18. Apparatus for determining the location of a movable spool element according to claim 17 wherein:

said magnet means comprises a pair of oppositely polarized magnets one mounted on either side of said center.

19. Apparatus for determining the location of a movable spool element according to claim 18 wherein said pair of magnets are fixed in side-by-side abutting relationship.

20. Apparatus for determining the location of a movable spool element according to claim 19 wherein said pair of magnets and Hall effect transducer are mounted to provide a linear field strength versus displacement function over a spool displacement range of plus or minus 0.015 inches.

21. Apparatus for determining the location of a movable spool element according to claim 18 wherein said pair of magnets are fixed in spaced apart side-by-side relationship.

22. Apparatus for determining the location of a movable spool element according to claim 21 wherein said magnets are spaced apart a distance sufficient to provide a linear field strength versus displacement function over a spool displacement range of plus or minus 0.035 inches.

* * * * *